United States Patent [19]

Chenoweth et al.

[11] Patent Number: 4,892,773
[45] Date of Patent: Jan. 9, 1990

[54] PREPARATION OF AMORPHOUS METAL CORE FOR USE IN TRANSFORMER

[75] Inventors: Terrence E. Chenoweth, Watkinsville; Eugenius S. Hammack, Athens, both of Ga.; Wallace L. McDonald, Sandy Springs, S.C.

[73] Assignee: Westinghouse Electric Corp., Pittsburgh, Pa.

[21] Appl. No.: 79,854

[22] Filed: Jul. 30, 1987

[51] Int. Cl.[4] .............................. B32B 3/04
[52] U.S. Cl. .................... 428/121; 156/95; 156/110.1; 156/196; 156/247; 156/307.1; 156/323; 428/246; 428/251; 428/252; 428/285; 428/906
[58] Field of Search ............. 428/121, 246, 251, 252, 428/285, 906; 156/95, 110.1, 196, 247, 307.1, 323

[56] References Cited

U.S. PATENT DOCUMENTS 4,239,572 12/1980 Tomita .......................... 428/121

Primary Examiner—Marion C. McCamish
Attorney, Agent, or Firm—Joyce L. Morrison; Alex Mich, Jr.; R. D. Fuerle

[57] ABSTRACT

Disclosed is a method of preparing an amorphous metal core 1 for use in a transformer. The uncut legs 7, 8 and 9 of the core 1 are covered with an adhesive impregnated substrate 10, the edges 11 of which are bent over to make contact with the core 1. A release sheet 12 and a plate 13 are placed over the adhesive impregnated substrate, the plate 13 is pressed against the core 1, and the adhesive is cured. The process is repeated with the edges on the opposite side of the core.

14 Claims, 1 Drawing Sheet

U.S. Patent
Jan. 9, 1990
4,892,773
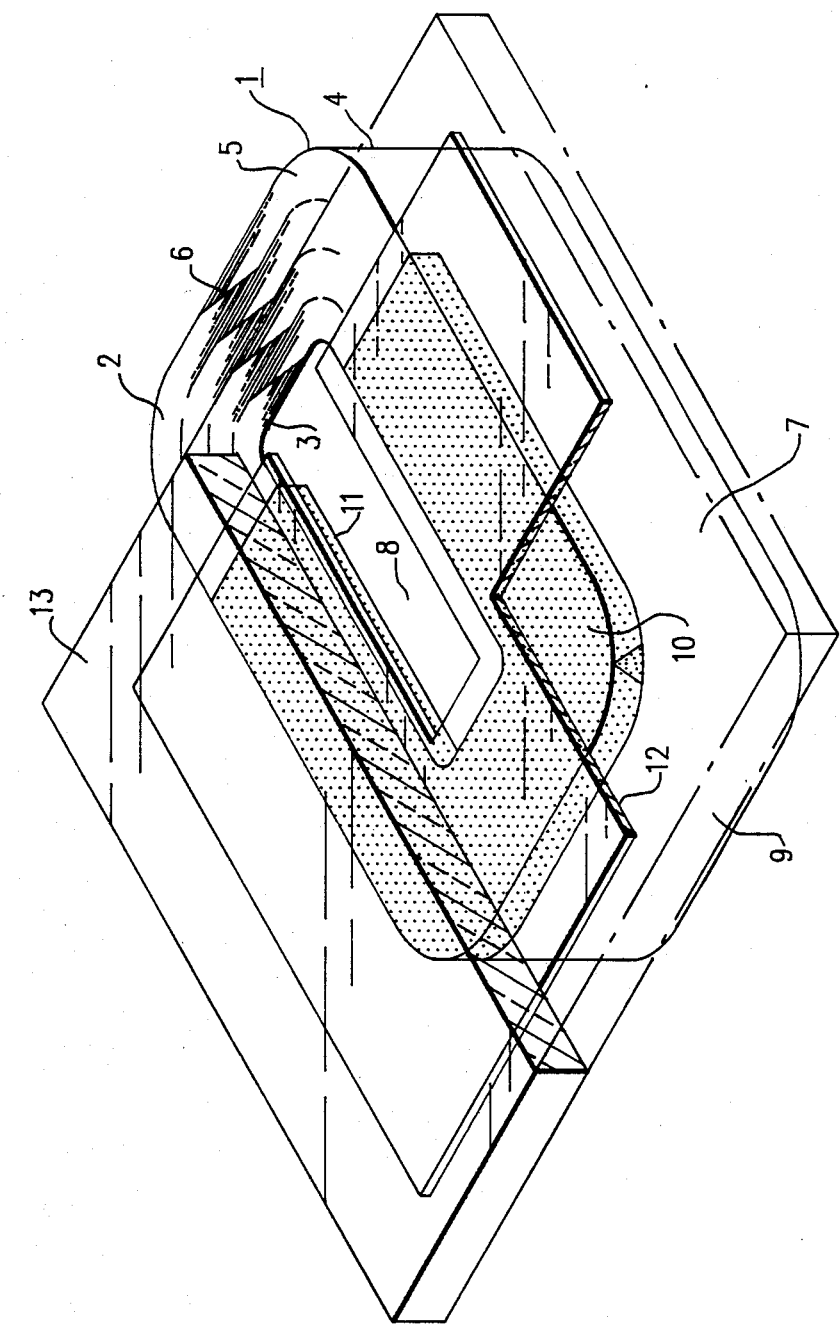

4,892,773

PREPARATION OF AMORPHOUS METAL CORE FOR USE IN TRANSFORMER

TECHNICAL FIELD

The invention relates to the preparation of amorphous metal cores for use in transformers. More particularly, it relates to protecting and encasing annealed rectangular amorphous metal cores using sheets of a substrate impregnated with an adhesive.

This application is related to U.S. application Ser. No. 07/087,929, filed Aug. 21, 1987, by T. E. Chenoweth et al., titled, "Repairable Transformer Having Amorphous Metal Core."

BACKGROUND OF THE INVENTION

Despite its high cost, amorphous metal is gradually replacing electrical grade steel in transformer cores because it is a lower loss material. A wound core transformer can be made from amorphous metal by winding an amorphous metal sheet into a core, cutting one leg of the core, and forming the metal into a rectangular shape. The amorphous metal is then annealed, which converts it into a very brittle material. At this point, the core, except for the cut leg, may be protected by the application of a resinous coating. The coating prevents damage to the core and the escape of broken fragments of amorphous metal into the transformer oil where they might cause shorts. The cut leg is opened, coils are placed over other legs of the core, and the cut leg is closed and sealed. Final assembly is accomplished by placing the core with the coils mounted over its legs into a tank of oil where it is tested at high voltage.

The use of resinous coatings alone to protect the core has been found to be unsatisfactory because the coatings are not strong enough to withstand the stresses on the core, and they crack and fragment during use which can result in damage to the core. Cracking of the coating exposes the amorphous metal core to the oil in the transformer and permits fragments of amorphous metal to enter the transformer oil, possibly causing shorts.

It is the main object of this invention to protect amorphous metal transformer cores from damage, and to prevent pieces of the core from entering the transformer oil. It is a further object of this invention to provide protection that is inexpensive, easily applied, strong enough to resist damage during assembly and in operation, and is uniformly flat so that the coils can fit over the legs of the core.

DISCLOSURE OF THE INVENTION

We have discovered that amorphous metal cores can be protected by the application of an adhesive impregnated substrate which covers both edges of the core, and extends beyond the edges; the portions that extend beyond the edges are bent against the core. A plate is placed over the portion of the substrate that covers the edges and the adhesive is cured. When the plate is removed, the surface of the substrate that is bonded to the edges is uniformly flat and the overlapping portions of the substrate prevent the substrate from breaking away from the edges. The resulting protection is strong enough to resist the stresses to the core that occur during assembly and operation of the transformer, and prevents the escape of particles of amorphous metal into the oil. The core is not impregnated, and resin does not enter the interstices between core laminations.

BRIEF DESCRIPTION OF THE DRAWINGS

The invention will become more apparent by reading the following detailed description in conjunction with the drawings, which are shown by way of example only, wherein:

The accompanying drawing is an isometric view, partially cut away, showing a certain presently preferred embodiment of an amorphous metal transformer core prepared according to the process of this invention.

DESCRIPTION OF THE PREFERRED EMBODIMENTS

In the drawing, a rectangular amorphous metal core 1 consists of amorphous metal 2 on mandrel 3 enclosed within a jacket 4. One leg 5 of the core has been cut at 6 so that the core can be opened for placement of coils (not shown) over the two long legs 7 and 8. Legs 7, 8, and 9 have been covered with an adhesive impregnated substrate 10. The edges 11 of substrate 10 are about 0.25 to about 1 inch wide and have been bent over so that they are in contact with the core 1. A release sheet 12, such as a film of polyethylene, has been placed over adhesive impregnated substrate 10, followed by a flat plate 13 over that portion of the adhesive impregnated substrate 10 which is in contact with the exposed edges of the amorphous metal core. In this position, the adhesive impregnated substrate is cured. Release sheet 12 and plate 13 are then removed. The core is then inverted and a similar adhesive impregnated substrate is bonded to the opposite side.

The process of this invention may be applied to amorphous metal cores of any shape or size that contain amorphous metal, including rectangular, circular, cruciform (rectangular, but circular in cross-section), and other shapes. Amorphous metal is a commercially available material sold by Allied Signal Corporation under the trade designation "METGLAS," currently in a nominal thickness of about 1 mil and widths of about 1 to 8 inches. It is generally made of iron, boron, and silicon and typically contains about 80% (by weight) iron, 14% boron, and 4% silicon, and may also contain carbon, cobalt, nickel, and other elements. It is prepared by rapidly quenching a thin sheet of metal. (See U.S. Pat. No. 3,845,805, herein incorporated by reference, for additional information.) The amorphous metal is wound, cut through one leg, formed into a rectangular shape, and annealed to enhance its electrical properties prior to treatment according to the process of this invention.

The substrates used in the process of this invention may consist of any type of adhesive impregnable or porous material that is strong, a good insulator, and is chemically inert. Suitable materials include glass and various organic fibrous materials such as polyesters, polyimides, and polyamides; glass is preferred for its strength, chemical inertness, and good insulating properties. The substrate material is preferably woven for greater strength, though matted material may also be used.

Examples of adhesives that can be used to impregnate the substrate material include ultra violet light (UV) curable, heat curable, or 2-part resins that cure when the two parts are mixed. UV curable resins are preferred as they do not require a heating and cooling period and therefore are much faster to cure. If a UV curable adhesive is used, plate 11 and release sheet 12 should be transparent to UV light so that the light passes through the plate to cure the adhesive. Epoxy, polyester, phenolic, and other types of organic resinous materials could also be used. The preferred adhesive is a UV curable modified epoxy urethane resin available under the designation "F-13" by Westinghouse Electric Corporation and described in U.S. Pat. No. 4,481,258, herein incorporated by reference.

We have found that that portion of the adhesive impregnated substrate that extends beyond the edges of the amorphous metal core and which is bent over to make contact with the core has a tendency to spring away from the core prior to cure, especially at corners. We have further found that this problem can be solved by the inclusion in the adhesive composition of about 4 to about 6% by weight (based on adhesive weight) of a thixotrope. Preferred thixotropes include fumed silica, mica flakes, and milled glass fibers, as they are transparent to UV light; fumed silica is the most preferred thixotrope. Fumed silica is a commercially available product sold by Cabot Corporation under the trade designation "CAB-O-SIL" (such as grade "M5"). We have also found that the thixotrope prevents the seepage of the resin into the core between the laminations. Seepage of resin into the core leads to higher stresses when the resin cures, and higher stresses lead to higher losses.

Release sheet 12 prevents adhesive impregnated substrate 10 from bonding to the plate 13. Suitable release sheets include films of polyethylene, polypropylene, polyethylene terephthalate, and polyamides. Polyethylene film is preferred because it is inexpensive and has been found to work well. It is also transparent to UV light. Plate 13 is preferably of UV transparent glass if the adhesive is UV curable, but could also be steel, laminates, or other materials if a UV curable resin is not used. Plate 13 preferably has a sheet of polyethylene or polypropylene foam mounted to its bottom so that the pressure is more uniformly applied.

The following example further illustrates this invention.

EXAMPLE

Annealed rectangular wound amorphous metal cores 15.4 inches by 10.7 inches outside dimension and 9.4 inches by 4.7 inches inside dimension, three inches thick, having a steel mandrel and a steel outside wrap, as shown in the drawing, with one leg cut, were placed on one edge. Sheets of woven glass cloth 4 inches wide and 0.13 inches thick were impregnated with about 0.04 grams of "F-13" UV curable adhesive per square centimeter of glass cloth. Cores were prepared using no thixotrope, and 4½ and 5% by weight "Cab-O-Sil" fumed silica in the adhesive. Three sheets of the adhesive impregnated glass cloth were placed over the exposed edges of the uncut legs; the cloth extended over the edges of the core about 0.5 inches. A sheet of polyethylene 0.75 mils thick was then placed over the exposed adhesive impregnated substrate and was slit in the center and taped down. The corners of the cloth were cut and the portions of the cloth that extended beyond the edges of the core were bent 90 degrees and pressed into contact with the core. A glass plate 0.25 inches thick with polypropylene foam about 3/16 inches thick attached on its bottom was placed over the polyethylene sheet and pressed downward to flatten the adhesive impregnated substrate glass cloth. The adhesive impregnated glass cloth was then exposed to UV light by passing it under a 300 watt/inch bulb; total exposure time was about 1 minute. The glass plate and the polyethylene film were removed. The adhesive in the glass cloth was completely cured and the surface of the glass cloth that covered the edges of the core was flat. The amorphous metal cores were then inverted and the same procedure was repeated on the opposite edge.

The cloth that was bent over which was impregnated with adhesive that did not contain a thixotrope pulled away from the core; the cloth that was impregnated with adhesive that contained 4½ and 5% thixotrope did not pull away from the core where it was bent over. In all cases, the adhesive impregnated cloth was firmly bonded to the edges of the core. The cut legs of the cores were opened, coils were placed over the two long legs, the cut legs were closed and sealed, using the same materials as above described, but without using the glass curing plate. The core was placed in a tank of oil and was successfully tested.

We claim:

1. An amorphous metal core having an adhesive impregnated substrate of woven cloth or matted material selected from the group consisting of glass, polyesters, polyimides, polyamides and mixture thereof that is impregnated with a curable adhesive comprising a thixotrope bonded to at least a portion of each edge, where said substrate extends beyond said edge, is bent over said edge, and is bonded to said core.

2. A core according to claim 1 wherein said substrate is glass cloth and said adhesive is UV cured.

3. A core according to claim 1 wherein said one leg of said core is cut and said substrate covers all edges of said core except the edges of said cut leg.

4. A core according to claim 1 wherein said adhesive contains about 4 to about 6% by weight of a thixotrope.

5. A method of preparing an annealed amorphous metal core for use in a transformer comprising:
   (A) covering at least portions of the edges of said core with an insulating substrate of woven cloth or matted material selected from the group consisting of glass, polyesters, polyimides, polyamides and mixtures thereof that is impregnated with a curable adhesive comprising a thixotrope, said substrate extending beyond said edges;
   (B) bending the portions of said substrate that extend beyond said edges over said edges and into contact with said core;
   (C) placing a plate over the portion of said substrate that covers said edges and pressing said plate against said core; and
   (D) curing said adhesive.

6. A method according to claim 5 wherein a release sheet and a layer of a foamed sheet are placed between said plate and said substrate.

7. A method according to claim 6 wherein said release sheet and said foamed sheet are polyethylene or polypropylene.

8. A method according to claim 5 wherein said adhesive is UV curable, said plate is UV transparent, and said adhesive is cured by passing UV light through said plate.

9. A method according to claim 8 wherein said adhesive includes about 4 to about 6 percent by weight (based on total adhesive weight) of a thixotrope.

10. A method according to claim 9 wherein said thixotrope is selected from the group consisting of fumed silica, mica flakes, milled glass fibers, and mixtures thereof.

11. A method according to claim 5 wherein said substrate is woven glass cloth.

12. A method according to claim 5 wherein said core is placed in a horizontal position with an exposed edge of said amorphous metal core facing upward prior to said method and is inverted for application of said method to the opposite side.

13. A method of preparing an annealed rectangular wound amorphous metal core having one unit leg for use in a transformer comprising:
 (A) placing said core in a horizontal position with one edge of said amorphous metal core facing upward;
 (B) covering uncut legs of said core with a woven glass cloth impregnated with a UV curable adhesive containing about 4 to about 6 percent by weight (based on total adhesive weight) of fumed silica, where said cloth extends beyond said edge of said core by about 0.25 to about 1 inch;
 (C) bending the portions of said cloth that extend beyond said edges of said core 90 degrees downward and pressing said portions against said core;
 (D) placing a release sheet over said cloth;
 (E) placing a UV transparent plate over said release sheet and pressing said plate against said core; and
 (F) passing UV light through said plate to cure said adhesive;
 (G) inverting said core and repeating steps (A) through (F).

14. A method according to claim 13 wherein said release sheet is a film of polyethylene.

* * * * *